(12) United States Patent
Millon et al.

(10) Patent No.: US 8,870,576 B2
(45) Date of Patent: Oct. 28, 2014

(54) SURGICAL TRAINING AIDS AND METHODS OF FABRICATION THEREOF

(75) Inventors: Leonardo Millon, London (CA); Wankei Wan, London (CA); Mackenzie Quantz, Komoka (CA)

(73) Assignee: The University of Western Ontario, London, ON (CA)

( * ) Notice: Subject to any disclaimer, the term of this patent is extended or adjusted under 35 U.S.C. 154(b) by 31 days.

(21) Appl. No.: 13/497,670

(22) PCT Filed: Sep. 22, 2010

(86) PCT No.: PCT/CA2010/001453
§ 371 (c)(1),
(2), (4) Date: Jul. 26, 2012

(87) PCT Pub. No.: WO2011/035410
PCT Pub. Date: Mar. 31, 2011

(65) Prior Publication Data
US 2012/0282584 A1 Nov. 8, 2012

Related U.S. Application Data

(60) Provisional application No. 61/244,690, filed on Sep. 22, 2009.

(51) Int. Cl.
| | | |
|---|---|---|
| G09B 23/28 | (2006.01) |
| C08J 3/075 | (2006.01) |
| B29C 39/42 | (2006.01) |
| B29C 39/00 | (2006.01) |
| B29C 39/02 | (2006.01) |
| G09B 23/30 | (2006.01) |
| B29L 31/00 | (2006.01) |
| B29K 105/00 | (2006.01) |
| B29K 29/00 | (2006.01) |

(52) U.S. Cl.
CPC ....... B29C 39/025 (2013.01); *B29L 2031/7532* (2013.01); G09B 23/28 (2013.01); C08J 3/075 (2013.01); *C08J 2329/04* (2013.01); B29C 39/42 (2013.01); B29C 39/003 (2013.01); *B29K 2105/0061* (2013.01); G09B 23/306 (2013.01); *B29K 2029/04* (2013.01)
USPC .......................................... 434/267

(58) Field of Classification Search
USPC .......................... 434/262, 267, 270, 272, 274
See application file for complete search history.

(56) References Cited

U.S. PATENT DOCUMENTS

| | | | | |
|---|---|---|---|---|
| 6,474,993 B1 * | 11/2002 | Grund et al. | ................... | 434/262 |
| 8,297,982 B2 * | 10/2012 | Park et al. | ..................... | 434/262 |
| 8,480,407 B2 * | 7/2013 | Campbell et al. | ............. | 434/272 |
| 8,512,044 B2 * | 8/2013 | Sakezles | ....................... | 434/267 |

(Continued)

FOREIGN PATENT DOCUMENTS

| | | |
|---|---|---|
| CA | 2675217 A1 | 2/2010 |
| EP | 1801135 A1 | 6/2007 |

*Primary Examiner* — Kurt Fernstrom
(74) *Attorney, Agent, or Firm* — Hill & Schumacher

(57) ABSTRACT

The present invention provides surgical training aids formed from hydrogels and adapted to exhibit realistic mechanical properties mimicking those of real organs. Surgical training aids are preferably fabricated by subjecting a concentration of polyvinyl alcohol to freeze-thaw cycles in a mold designed to approximate the shape of an organ, and process parameters are selected to tailor the mechanical properties of the formed hydrogel to those of the organ simulated by the surgical aid. The mechanical properties of the hydrogel forming the surgical training aid may be tailored by incorporating bacterial cellulose and by applying strain during hydrogel formation, thereby producing controlled anisotropy.

12 Claims, 9 Drawing Sheets

(56) References Cited

U.S. PATENT DOCUMENTS

| | | |
|---|---|---|
| 2007/0154429 A1 | 7/2007 | Thomas et al. |
| 2008/0076101 A1* | 3/2008 | Hyde et al. .................... 434/272 |
| 2008/0187895 A1 | 8/2008 | Sakezles |
| 2009/0214623 A1* | 8/2009 | Wan et al. ..................... 424/447 |

* cited by examiner

SURGICAL TRAINING AIDS AND METHODS OF FABRICATION THEREOF

CROSS-REFERENCE TO RELATED APPLICATION

This application is a National Phase application claiming the benefit of PCT/CA2010/001453 filed on Sep. 22, 2010, in English, which further claims priority to U.S. Provisional Application No. 61/244,690 titled "SURGICAL TRAINING AIDS AND METHODS OF FABRICATION THEREOF" and filed on Sep. 22, 2009, the entire contents of which are incorporated herein by reference.

FIELD OF THE INVENTION

This invention relates to the field of surgical skills training, and more particularly relates to the field of surgical models, simulators, aids, kits and methods of training for surgical procedures involving anastomosis of tubular structures, as well as dissecting, cutting and suturing of soft tissues and organ models.

BACKGROUND OF THE INVENTION

Traditionally, surgical training and skill development has been performed in the operating room on living patients. However, there are increasing medical, legal and ethical concerns about the use of patients as a learning platform by surgical trainees.

An alternative is the use of surgical skill laboratories where organs and tissues from animals and human cadavers are used. There is an obvious limitation to both of these approaches, where animal models might not be as accurate as human anatomically and human cadavers are costly and often in limited supply. While human cadavers provide the advantages of presenting the correct anatomy, they disadvantageously do not possess the proper feel of living human tissues, since body is embalmed by submerging in chemicals that change the mechanical properties of the tissues. Additionally, cadavers are expensive and have disposal issues as they have to be disposed by incineration due their biohazard classification. The potential for infectious disease transmission is another concern.

An alternative but still costly solution is to provide live animals as surgical teaching resources. Indeed, live animals such as pigs may be used in beating heart surgical training sessions. However, live animals do not possess the right physiology, when compared to human tissues and organs. Furthermore, live animals can necessitate approval of the ethics board and animal rights groups, and also may require expensive animal facilities with well trained veterinary staff.

Another option is to provide explanted animal tissues and organs, such as porcine hearts, which are relatively inexpensive. Unfortunately, such biological samples require special handling, can present problems with transgenic contamination, and require disposal as a 'biohazard'.

Recently, synthetic polymer simulator devices have been employed as testing devices. Unfortunately, state-of-the-art anatomic replicates suffer from numerous disadvantages that have hampered their widespread adoption as teaching tools. Such devices are typically based on silicone rubber, polyurethane, natural rubber, PVC, or foam, and therefore do not replicate properties or the "feel" of the real organs and do not provide an optimal experience to surgical skills training. While these models may look quite realistic, they fail in producing realistic response in the surgical steps of handling, cutting and suturing, their general 'feel' or mechanical behavior is often very different from that of the natural tissues. Accordingly, such materials do not provide the necessary material properties to be used as effective surgical teaching tools.

The need for improved synthetic surgical training aids was recently highlighted by Hwang et al. (G. Hwang, C. W. Oh, S. Q. Park, S. H. Sheen, J. S. Bang, and H. S. Kang, "Comparison of Different Microanastomosis Training Models: Model Accuracy and Practicality"), who compared the performance of synthetic anastomosis tubes with that of animal models. The synthetic anastomosis tubes used were shown to significantly underperform animal models with regard to both practicality and accuracy.

What is therefore needed is a new class of devices and methods for teaching surgical techniques, in which the mechanical and visco-elastic response of real tissues is reproduced with improved accuracy.

SUMMARY OF THE INVENTION

The present invention addresses the aforementioned shortcomings by providing improved surgical training aids formed from hydrogels and methods of fabrication thereof.

Hydrogel-based surgical training devices not only have the "feel" of real tissues, such as cardiovascular tissue, but by altering several processing and composition parameters, the hydrogels can be adapted to have the correct mechanical properties of the targeted tissues, including anisotropy, (for example, the aorta and saphenous veins) to give a realistic surgical training experience.

Accordingly, in a first aspect, there is provided a method of producing a multilayer hydrogel, the method comprising the steps of: a) flowing a first volume of a first aqueous solution of polyvinyl alcohol into a mold; b) thermally cycling the solution through at least one freeze-thaw cycle to form a polyvinyl alcohol hydrogel layer within the mold; c) removing the polyvinyl alcohol hydrogel layer from the mold; d) flowing an additional volume an additional aqueous solution of polyvinyl alcohol into an additional mold on top of a previously formed polyvinyl alcohol hydrogel layer; e) thermally cycling the additional mold through at least one freeze-thaw cycle to form a multilayer polyvinyl alcohol hydrogel layer within the mold; and f) removing the multilayer hydrogel from the mold. Preferably, parameters that may include a temperature rate change during the thermal cycling, a number of thermal cycles, maximum and minimum temperatures attained during the thermal cycling, a freezing holding time, a concentration of polyvinyl alcohol, and any combination thereof, are controlled such that the multilayer hydrogel exhibits at least one mechanical property approximately equal to that of an organ. Steps d) to f) may be repeated at least once.

The mold or the additional mold may further comprise a rod for forming an embedded tubular structure within a layer of the multilayer hydrogel, where the method further comprises the step of removing the rod from the multilayer hydrogel prior to step f).

Strain may be applied to the multilayer hydrogel while performing step b) and/or step e) for generating anisotropy within at least one layer of the multilayer hydrogel.

A mechanical property of each layer within the multilayer hydrogel is preferably selected to approximate skin. The first aqueous solution of polyvinyl alcohol and the additional aqueous solution of polyvinyl alcohol may be a common solution of polyvinyl alcohol.

In another aspect, there is provided a multilayer anatomical model of an organ comprising a multilayered hydrogel, wherein the organ comprises multiple layers, and wherein each layer of the multilayered hydrogel is configured to approximate at least one mechanical property of a corresponding layer of the organ. Each hydrogel layer preferably comprises polyvinyl alcohol, where a concentration of water in each layer preferably exceeds approximately 70%. The organ is preferably skin. A layer of the multilayered hydrogel may further comprise a hollow tubular structure.

In yet another aspect, there is provided a surgical training kit for practicing an anastomosis procedure, the kit comprising: a first model of a first organ comprising a first tubular structure, the first model formed from a hydrogel comprising a mechanical property approximately equal to that of the first organ; a second model of a second organ comprising a second tubular structure, the second model formed from a second hydrogel comprising a mechanical property approximately equal to that of the second organ; wherein the second model of the second organ is selected for attachment to the first tubular structure according to the anastomosis procedure. The second tubular structure is preferably configured for attachment to the first tubular structure.

The shape of the first model preferably approximates at least a portion of the first organ, and a shape of the second model preferably approximates at least a portion of the second organ. A shape of at least one of the first and second models preferably comprises an anatomical defect. At least one of the first and second hydrogels preferably comprises polyvinyl alcohol.

At least one of the first and second hydrogels preferably comprises a physically crosslinked hydrogel, and at least one of the first and second hydrogels is preferably formed by a method comprising thermally cycling a precursor solution through at least one freeze-thaw cycle. The physically crosslinked hydrogel may be anisotropic, wherein the mechanical property is an anisotropic mechanical property.

The kit may further comprise a material for suturing the first tubular structure to the second tubular structure, and/or a surgical tool for suturing the first tubular structure to the second tubular structure.

The first organ may have embedded therein the first tubular structure, wherein the second organ is the second tubular structure. A concentration of water in each hydrogel layer preferably exceeds approximately 70%.

In still another embodiment, there is provided a method of practicing an anastomosis procedure, the method comprising the steps of: providing a first model of a first organ comprising a first tubular structure, the first model formed from a first hydrogel comprising a mechanical property approximately equal to that of the first organ; providing a second model of a second organ comprising a second tubular structure, the second model formed from a second hydrogel comprising a mechanical property approximately equal to that of the second organ, wherein the second model of the second organ is selected for attachment to the first tubular structure according to the anastomosis procedure; and suturing the second tubular structure to the first tubular structure.

A shape of the first model is preferably chosen to approximate at least a portion of the first organ, and a shape of the second model is chosen to approximate at least a portion of the second organ. At least one of the first and second models may comprise an anatomical defect. At least one of the first and second hydrogels comprises polyvinyl alcohol.

In yet another aspect, there is provided a kit for practicing a surgical procedure, the kit comprising: a model of a first organ, the model formed from a hydrogel, wherein the hydrogel comprises a mechanical property approximately equal to that of the first organ; and a base for supporting the first organ during the surgical procedure; wherein the model of the first organ is removably attachable to the base at an appropriate anatomical position.

The base preferably comprises a rigid material, such as a polymer or a metal. The base may comprise a shape approximating at least a portion of a second organ.

The first organ may comprise a first tubular structure, and the kit may further comprising an additional model of an additional organ comprising an additional tubular structure, the additional model formed from an additional hydrogel comprising a mechanical property approximately equal to that of the additional organ, and wherein the additional model of the additional organ is selected for attachment to the first tubular structure according to an anastomosis procedure.

The first organ may comprise a heart valve or an aortic root structure, and the second organ may comprise a heart. The aortic root structure may comprise two or more coronary arteries attached to the aortic root structure and an adjacent ascending aorta. The aortic root structure may comprise an anatomical detect.

The kit may further comprise a prosthetic or mechanical heart valve for use in one of a valve repair and a valve replacement procedure. The base is preferably reusable.

In another embodiment, there is provided a method practicing a heart valve repair procedure, the method comprising the steps of: providing a model of a heart valve, the model formed from a hydrogel, wherein the hydrogel comprises a mechanical property approximately equal to that of the heart valve; providing a base comprising a shape approximating at least a portion of a heart, wherein the model of the heart valve is removably attachable to the base at an appropriate anatomical position; attaching the model of the heart valve to the base; and repairing the model of the heart valve. The method preferably further comprises the steps of: providing an annuloplasty ring; and attaching the annuloplasty ring to the model of the heart valve. The hydrogel preferably comprises polyvinyl alcohol.

A further understanding of the functional and advantageous aspects of the invention can be realized by reference to the following detailed description and drawings.

BRIEF DESCRIPTION OF THE DRAWINGS

The embodiments of the present invention are described with reference to the attached figures, wherein.

DETAILED DESCRIPTION OF THE INVENTION

Figure 1:
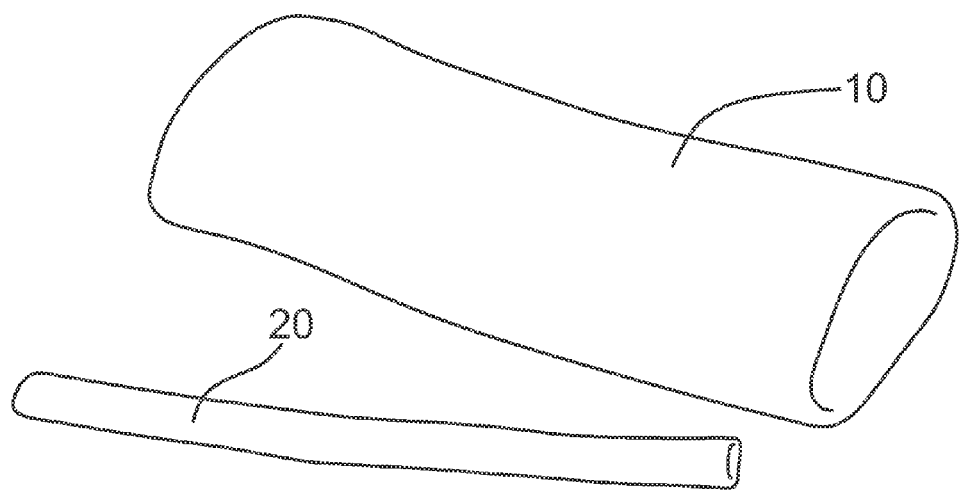
FIG. 1 shows an image of a kit for practicing an anastomosis procedure, where two tubular organ models of different diameter are provided.

Generally speaking, the systems described herein are directed to hydrogel-based kits and methods of training for surgical procedures. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to polyvinyl alcohol hydrogel-based kits and methods of surgical skills training of procedures.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

Surgical training devices, kits and methods are provided in which organ models are formed from a hydrogel. Preferably, the hydrogel is a PVA-hydrogel, and more preferably, the hydrogel is a low-temperature, physically crosslinked hydrogel. Methods of fabricating PVA hydrogels with specific mechanical properties tailored to approximate those of real organs are disclosed in US Patent Application No. US200510037082, which is incorporated herein by reference in its entirety. Disclosed herein are novel kits and methods configured for performing a wide range of surgical training procedures.

Selected hydrogel materials have been shown to provide stress-strain relationships characteristic of real tissue. For example, the polyvinyl alcohol (PVA) hydrogel material system has been shown by the present inventors to be amenable to processing techniques that result in mechanical properties similar to typical soft tissues ranging from skin to cardiovascular tissues [Wan, Campbell, Zhang, Hui, Boughner, J. Biomed. Mater. Res. 63B: 854-861 (2002)]. More recently, a PVA-bacterial cellulose nanocomposite has been demonstrated for extending the material properties well beyond that of cardiovascular tissues [Millon, Wan, J. Biomed. Mater. Res. 79B: 245-253 (2006)]. Anisotropic PVA-hydrogel have also been created such that orientation-dependent soft tissue properties are reproduced [Millon, Mohammadi, Wan, J. Biomed. Mater. Res. 79B: 305-311 (2006)]. More recently, a close match of articular cartilage using a PVA composite has been reported [Millon, Oates, Wan, J Biomed Mater Res 90B: 922-929 (2009)].

Physical crosslinking allows PVA hydrogels to retain their original shape and be extended up to six times their size. This demonstrates their rubbery and elastic nature and their high mechanical strength. While not wishing to be limited by theory, it has been proposed that the physical cross-linking process is an entropic reordering phenomenon. Water is likely to bind to the polymer by hydrogen bonding. When the solution freezes, ice crystals force the polymer chains close to each other forming regions or nuclei of high local polymer concentration. When the material thaws, these nuclei act as crosslinking sites for polymer molecules, which realign and form hydrogen bonds to form crystallites and polymer chain entanglements. The crystalline regions are formed within the polymer rich regions, with further cycling increasing both the size and number of the crystalline regions by repeating the process. On a molecular level, the crystallites of PVA can be described as having a layered structure, with a double layer of molecules held together by hydrogen bonds, while weaker van der Waals forces operate between the double layers. This folded chain structure leads to ordered regions (crystallites) within an unordered, amorphous polymer matrix. The mechanical properties of PVA hydrogels are unique compared to other polymers. The stress-strain curves for the polymeric materials are initially linear and then curve towards the strain axis. On the other hand, the PVA curve displays an exponential stress-strain curve similar to the characteristics of soft biological tissues, with the curve shifting towards the stress axis.

While the kits, models and methods disclosed herein preferably relate to PVA-hydrogels, it is to be understood that a wide range of hydrogel materials are suitable for the formation of surgical training aids according to various embodiments of the invention. Exemplary hydrogels include, but are not limited to, polyvinyl alcohol (PVA), poly(vinyl pyrrolidone) (PVP), poly(ethylene glycol) (PEG), poly(hydroxyethyl methacrylate) (PHEMA), polyurethanes, and polyacrylamide. Polyvinyl alcohol is the preferred choice for embodiments disclosed herein.

In a preferred embodiment, surgical training aids and kits with mechanical properties similar to that of organs are produced by providing a mold adapted to cast a hydrogel with a shape approximating that of an organ (such as a blood vessel). A solution of polyvinyl alcohol with a pre-selected concentration is prepared and added to the mold, preferably using injection. Preferably, the mold is closed and sealed with a sealing means such as an o-ring. The mold containing the polyvinyl alcohol solution is subsequently thermally cycled through at least one freeze-thaw cycle to form a polyvinyl alcohol hydrogel within the mold. After a selected number of freeze-thaw cycles have been performed, the surgical teaching aid is obtained by removing the formed hydrogel from the mold.

The mechanical properties are selected to approximate those of the organ by controlling process parameters, such as the rate change of temperature during said step of thermal cycling, the total number of thermal cycles, the maximum and minimum temperatures attained during thermal cycling, the freezing holding time, the hydrogel/water concentration. Preferably, at least one mechanical property of the formed hydrogel (such as the Young's modulus) is adapted to approximate that of the organ.

As described above, the shape of mold of the mold is adapted to produce a hydrogel formed with a shape approximating that of an organ. Preferred mold shapes include, but are not limited to, a coaxial mold for forming tubular structures such as a synthetic vascular or aortic vessel, and a planar mold adapted to form synthetic skin. The organ is preferably selected from a list including the following non-limiting examples: vascular vessels, coronary arteries, cardiac valves, cartilage, intervertebral discs, tendons, ligaments, skin, bowels, colon, urethra, ureter, vas deferens, bile duct, kidney, prostate, pancreas, spleen, esophagus, trachea, brain, lung, and eye.

The mold may be formed from a metal such as aluminum, or may be made from a non-metallic material such as a polymer. In general, the mold may have any shape (sheets, tubular, etc.) as desired to model an organ or a portion of an organ, and may even contain complex surfaces, for example in the case of a heart or prostate. In a preferred embodiment, the mold is constructed from a transparent material, such as a transparent polymer, that enables the detection of air bubbles during hydrogel formation. In another preferred embodiment, an air gap is provided when sealing the mold to accommodate thermal expansion of the hydrogel during freeze-thaw cycles.

The material properties of the surgical training aids formed of PVA-hydrogel may be further tailored by incorporating bacterial cellulose into the hydrogel during its fabrication. Such methods are disclosed in US Patent Application No. 2005/0037082, which is incorporated herein by reference in its entirety. Preferably, a concentration of bacterial cellulose is added to the polyvinyl alcohol solution during fabrication to produce a stress-strain curve that approximates the stress-strain curve of a real organ at increased strain levels.

In yet another embodiment of the invention, the PVA-hydrogel may be fabricated using a method adapted to impart anisotropy to the hydrogel. Methods for imparting anisotropy to PVA-hydrogel structures are provided in US Patent Application No. 2009/0214623, which is incorporated herein by reference in its entirety. Preferably, anisotropy is imparted by performing at least one freeze-thaw cycle and the transfer the hydrogel to a secondary mold adapted to apply a specific strain to the initially-formed hydrogel. Alternatively, the hydrogel may be an anisotropic PVA-bacterial cellulose composite hydrogel. Methods for producing such composite anisotropic hydrogels are disclosed in a co-pending U.S. patent application by the inventors with Ser. No. 12/379,384, which is also incorporated herein, by reference, in its entirety.

In another embodiment, additional constituents may be incorporated into the hydrogel during its fabrication. For example, chromophores, dyes or pigments may be incorporated into the hydrogel to produce a hydrogel with a desired colour or degree of opacity. Alternatively, other constituents, such as, but not limited to, contrast agents, chemical modifiers and substances for modifying the thermal or electrical conductivity of the hydrogel may be included.

In a preferred embodiment, the surgical aid according to the aforementioned embodiments is provided in a kit for practicing a surgical procedure. The kit preferably includes at least one hydrogel-based structure (preferably using PVA) adapted to exhibit one or more mechanical properties similar to that of a real organ, and one or more tools for conducting the surgical procedure. The kit may include a device for physically securing a portion of the surgical aid while practicing the surgical procedure. The kit may further include suturing materials for performing a suturing procedure, or other medical accessories or devices for use in a particular surgical procedure.

In a preferred embodiment, a surgical training kit includes two organ models that contain tubular structures for practicing an anastomosis procedure. The organs are selected such that the tubular structures may be joined via an anastomosis procedure to simulate the anatomical repair of the organs by joining the second tubular structure to the first tubular structure via a suturing process. FIG. 1 provides an image of an anastomosis kit according to this embodiment showing two hydrogel-based tubular organs 10 and 20, each with a different diameter, for use in an anastomosis procedure. Organs for simulating anastomosis procedures may include, but are not limited to, any one or more from the following list: vascular vessels, coronary arteries, bowels, colon, urethra, ureter, vas deferens, bile duct, trachea, and esophagus.

The organ models provided in the kit may simulate healthy organs, or may simulate pathological or anatomical defects and diseases. For example, in one non-limiting embodiment, a kit is provided for practicing as aneurysm repair procedure, where the kit includes one hydrogel-based tubular structure having a bulge to be removed, and another similar diameter tubular structure to be anastomosed for repair.

The two organs provided in an anastomosis kit may be selected from a wide range of organs containing tubular structures. In one embodiment, the two organs may be different portions of a single organ, such as two ends of a blood vessel or vas deferens. In another embodiment, the two organs may be different organs that can be nonetheless joined through an anastomosis procedure. In a preferred embodiment, the first organ is an organ containing an embedded tubular structure and the second organ is be a tubular structure to be sutured to the tubular structure of the first organ. For example, the first organ may be a heart or a section of skin containing blood vessels, and the second organ may be a section of a blood vessel to be sutured to a blood vessel within the first organ.

In yet another embodiment, the first organ comprises multiple tubular structures, such as multiple blood vessels embedded in skin or multiple blood vessels of the heart, and the second organ is a tubular structure that is provided for suturing to any of the multiple tubular structures embedded in the first organ. Preferably, at least one additional tubular structure is also provided for suturing to any of the multiple tubular structures embedded in the first organ, thus enabling a training surgeon to practice two or more suturing procedures.

It is to be understood that this embodiment is not limited to two organs, and a suitable surgical training kit may comprise three or more organs. For example, a kit may comprises a first organ comprising a tubular structure having lumen of a large diameter, and two or more tubular organs, each having smaller diameter lumens, enabling a practicing surgeon to perform multiple sutures of the smaller tubular organ onto the tubular structure of the organ having the larger diameter tubular structure.

In a preferred embodiment of the invention, a synthetic, tubular hydrogel-based structure is employed for surgical training, and a typical or characteristic biological fluid (real, synthetic, or a mixture thereof) is provided during surgical training within a lumen of the tubular structure to mimic typical biological conditions. In one embodiment, the fluid is static and is maintained within the lumen of the synthetic tubular structure at a characteristic biological pressure. In another embodiment, the fluid is circulated while maintaining a characteristic biological pressure.

The use of low-temperature processed PVA and PVA-BC hydrogels, as well as the inventive mold designs disclosed herein for various tissues and organs, represents a significant innovation towards the production of realistic devices for surgical skills training. Preferably, tissue and organ mimicking surgical aids according to embodiments of the present invention exhibit realistic anatomy, mechanical properties, and handling characteristics of a real tissues and organs for surgical skills training. Also, PVA hydrogel surgical devices are stored in water, making their handling more realistic as compared prior art devices.

PVA provides a number of benefits over traditional materials used as surgical training aids. PVA exhibits mechanical properties characteristic of many biological tissues and organs, and can be processed to have a realistic feel and suturability. This is in part due to the high water content of PVA hydrogels, which is similar to the tissues they are simulating. PVA models having realistic properties therefore enable surgical trainees and residents to train on synthetic models instead of training on real patients, animals or cadavers. PVA is also beneficial as it is non-latex, may be readily sterilized, is not toxic, and avoids the cost, biohazard risks and disposal issues associated with real tissues.

Although the preceding description has focused on vascular structures, the devices, kits and methods of the present invention may be applied to surgical training for procedures involving other types of tubular structures, such as ducts, glands, and lumen. Additional non-limiting examples include heart valves (aortic, mitral, pulmonary, tricuspid) with and without abnormalities, gastro-intestinal structures such as those relating to the esophagus, stomach, small bowel, large bowel, bile ducts, and pancreas, tubular structures of the urinary tract, kidney, colon, prostate and nerve structures (e.g. micro-surgical anastomosis training).

In another embodiment, a surgical training kit is provided for practicing valve repair and replacement procedures. Healthy and/or diseased heart valve models (for example, heart valve models each representing a different stage of disease) may be produced according to methods described above to facilitate surgical training of heart valve repair procedures, such as, but not limited to, annuloplasty ring repair, or full heart valve replacement. The valve model (healthy or diseased) preferably includes adjacent heart tissue with realistic anatomy.

In a preferred embodiment, the kit includes one or more heart valves (preferably exhibiting an anatomical defect to be corrected via a surgical repair or replacement process) and a base structure simulating at least a portion of a heart. The base includes openings for removably attaching the hydrogel valve models, and is preferably reusable. While the hydrogel valve models, which contain a high water content in their hydrated state, are realistic in their feel and mechanical properties, the heart base is preferably formed from a rigid material such as a hard polymer for providing a stable base with sufficient structural integrity to support a heart valve during a surgical training procedure.

The base preferably holds a valve in place by clamping the rim of the valve all around, while providing a central hole for the instruments to be able to go through, similar to the ventricle underneath the real valve. The valve may be inclined at an angle to imitate the view to the surgeon, or the angle could be adjusted. Chordae tendineae can be also added, to imitate the inelastic tendons holding the valve cusps (in the case of the mitral valve). The other side of the chordae tendineae is attached to the papillary muscles on the ventricle wall. All these realistic structures can be designed to provide a more realistic surgical model for training.

The 'heart base', which is preferably reusable by holding different healthy or diseased valves during multiple surgical training procedures, thus provides both a support structure for mounting and securing the heart valve models, and positions them in their correct anatomical orientation, thus providing a realistic simulating structure for a surgical procedure. The heart valves preferably include all four human heart valves, including the aortic, mitral, pulmonary, and tricuspid valves.

In another embodiment, a full aortic root structure, including a fully attached aortic heart valve, is provided for use with a heart base. The root structure preferable includes all relevant arteries and veins attached to the aorta, after the aortic root. This model can be used for simulating a realistic full aortic valve repair procedure, for example, using a prosthetic or a mechanical heart valve replacement (available from medical device companies). As noted above, the heart base for supporting the aortic root structure is preferable reusable.

Figure 2:
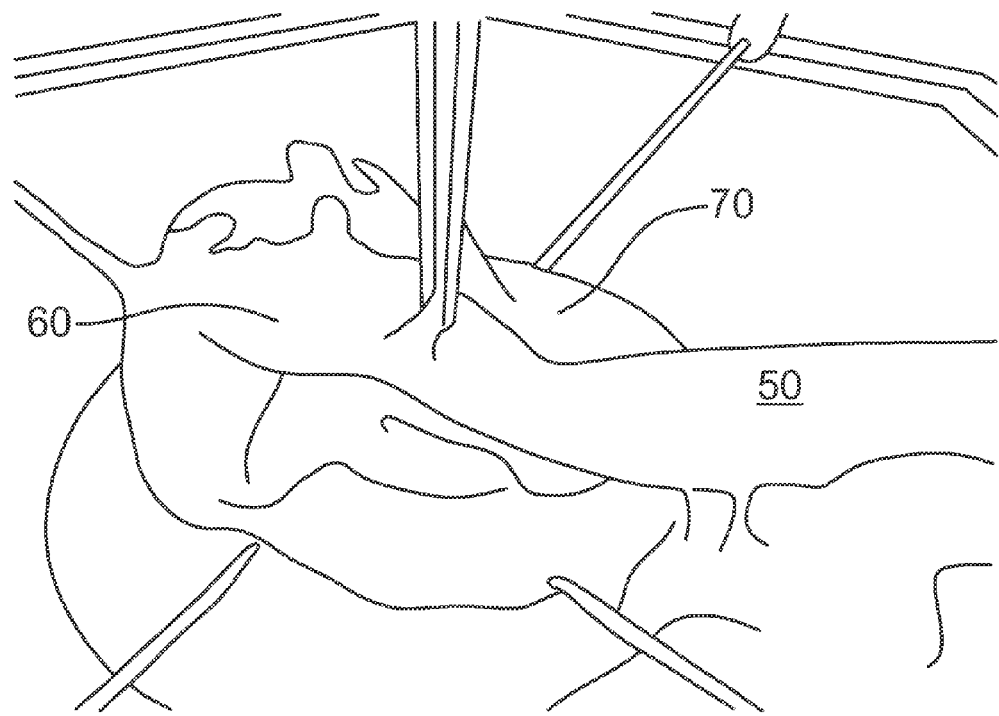
FIG. 2 is an image of a simulated aorta bypass procedure utilizing hydrogel-based tubular organs.

FIG. 2 provides an image of an end-to-end aorta anastomosis simulated surgical procedure in which a hydrogel-based aorta organ 50 is sutured to an aorta 60 attached to a heart 70. It is to be understood that the real heart shown in the image could be replaced with a synthetic heart base (as described above) having an aorta configured for simulating a surgical repair procedure, as is the case when repairing an aneurysm. This procedure can also be performed by suturing two hydrogel-based aorta organs.

In another embodiment, multilayer hydrogels, preferably modeling skin, are produced by first thermally cycling a layer in a sheet-shaped mold, preferably for up to 6 thermal cycles, with a predetermined thickness, imitating the epidermis and dermis. After this stiffer epidermis/dermis sheet is made, the layer is transferred to a different mold where new solution is injected and the mold is closed. This mold is also cycled, preferably up to 3 thermal cycles, to create a subcutaneous tissue, of which the main component is fat (weaker than epidermis/dermis). It is to be understood that the epidermis and dermis layers could be thermally cycled separately if there is a need to have predefined layers with different mechanical properties. Thus the level of complexity/mechanical properties and number of layers can be altered by changing the steps mentioned, and optionally the precursor solution. The mold may further comprise one or more rods for forming tubular structures within a layer of the multilayer hydrogel. In such a case, the rod is removed prior to removing the hydrogel from the mold.

The devices, kits and methods of the present invention are readily adaptable to a wide variety of surgical training applications. In general, the methods disclosed herein may be applicable to any surgical procedure involving the manipulation of tissue. For example, embodiments according to the present invention may be used as a training device or method for performing phlebotomy, skin grafts, skin cancer removal, cosmetic dermatological procedures, and laser surgery. Skin cancers or other types of anomalies can be designed for surgical training procedures in which a growth or other anatomical defect is to be removed (for example, by a plastic surgeon or dermatologist).

The following examples are presented to enable those skilled in the art to understand and to practice the present invention. They should not be considered as a limitation on the scope of the invention, but merely as being illustrative and representative thereof.

EXAMPLES

Example 1

Fabrication of Vascular PVA-Hydrogel Surgical Training Devices

PVA hydrogels that match the mechanical properties of selected cardiovascular tissues, such as coronary arteries, internal mammary artery, saphenous veins, and aorta, were developed.

PVA (Sigma-Aldrich Canada Co.) with a molecular weight (Mw) of 146,000-186,000, 99+% hydrolyzed was used in all solution preparations. The 10 wt % PVA solutions in distilled water were prepared using a mixed reactor vessel kept at 90° C. for 3 hours under reflux. The PVA concentration can be altered from 5% to 50% to alter final product properties.

Figure 3:
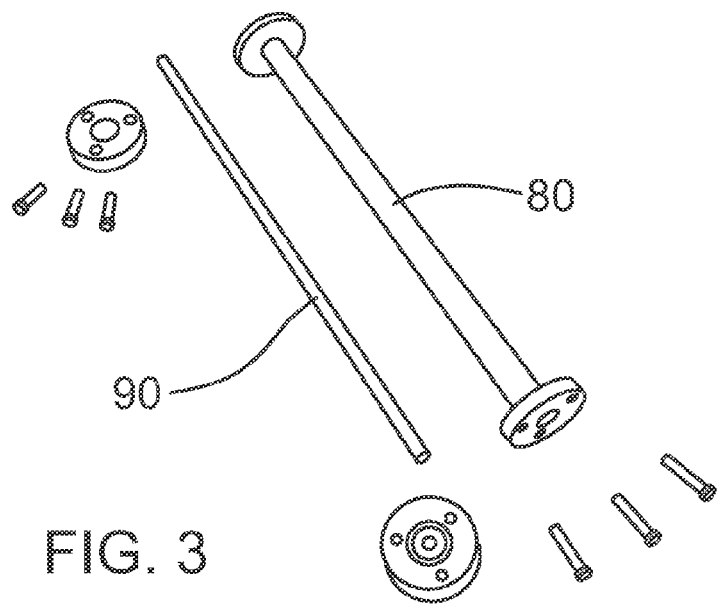
FIG. 3 shows aluminum molds and conduits for the fabrication of synthetic vascular surgical training aids.

As shown in FIG. 3, aluminum molds of large diameter 80 (25 mm-aorta) and small diameter 90 (4 mm-veins) conduits were designed and constructed. Six grafts of each diameter (with matching properties of several tissues) were developed and used in surgical training of bypass surgery to test handling, mechanical strength, feel, and suturability. In order to match some of the tissues, different degrees of anisotropy were implemented, going from 0% initial strain (isotropic) to 100% initial strain. In the case of applied initial strain (aorta), PVA solution was transferred into a small diameter conduit mold.

The mold was placed in a heated/refrigerated circulator. The molds were cycled between 20° C. and −20° C. once to give a cycle 1 sample, holding the sample at −20° C. for 1 hour and using a 0.1° C./min rate of cooling and thawing. This sample was taken out and stretched onto custom designed larger diameter rods, that allowed the tubular samples to be held in place at a desired strain of either 25, 50, 75, or 100% of the original diameter. The stretched samples were cycled up to 5 more times, using the same parameters, to obtain the desired mechanical properties. In general, increasing the number of cycles increases the stiffness of the conduits to match the target tissue. The degree of anisotropy remains constant, depending on the amount of initial strain (0 to 100%).

Figure 4:
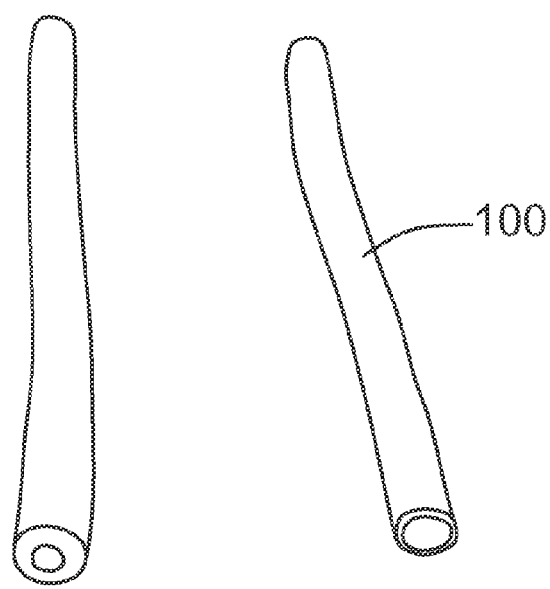
FIG. 4 shows PVA-hydrogel vascular surgical training aids with different sized wall thickness.
Figure 5A:
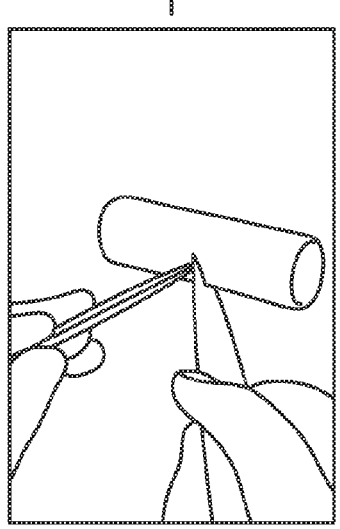
FIG. 5 shows the use of a surgical training kit according to one embodiment of the invention to practice an anastomosis procedure.
Figure 5B:
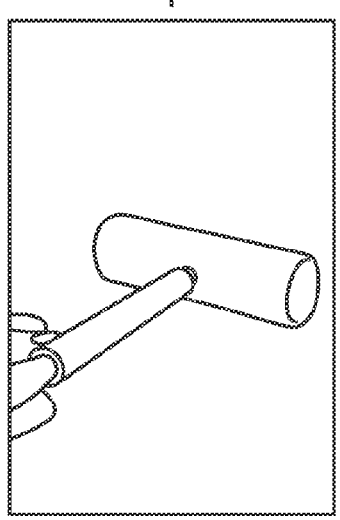
Figure 5C:
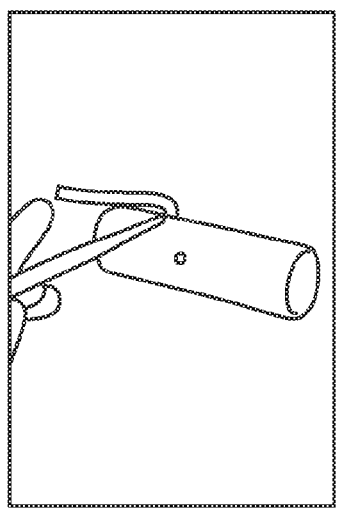
Figure 5D:
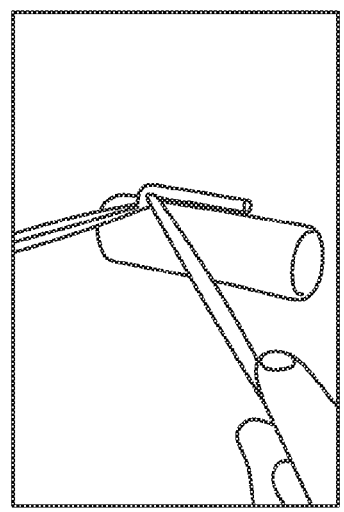
Figure 5E:
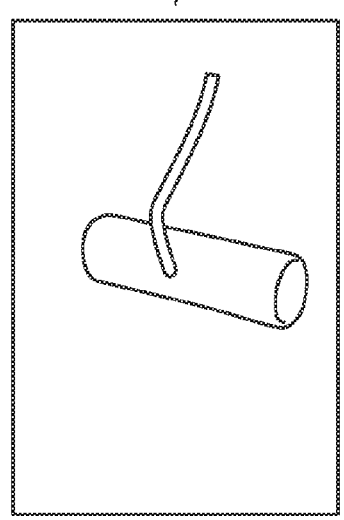
Figure 5F:
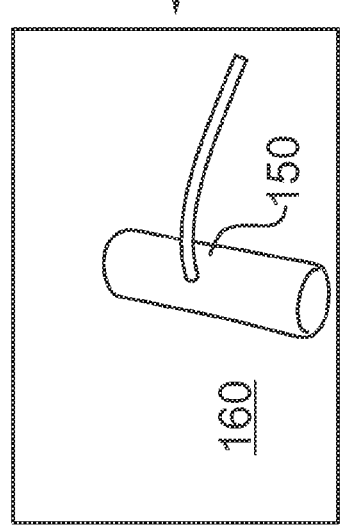

Changing the freezing and cooling rate will also affect the hydrogel properties, as well as changing the freezing holding time and the freezing temperature. FIG. 3 shows a small diameter vein mold. Different types of small diameter PVA-hydrogel conduits were reproduced, including changing inner diameter and wall thickness, as seen in FIG. 4 at 100.

Example 2

Evaluation of PVA-Hydrogel Vascular Device for Surgical Training

The 4 mm and the 25 mm diameter PVA-hydrogel conduits were sutured (anastomosed) together to simulate bypass grafting. This exercise was performed by an experienced surgeon. FIG. 5 shows the step-by-step anastomosis of a match of PVA vein 150 to aorta 160.

Example 3

Kit for Coronary Artery Bypass Grafting (CABG) Surgical Training

Figure 6:
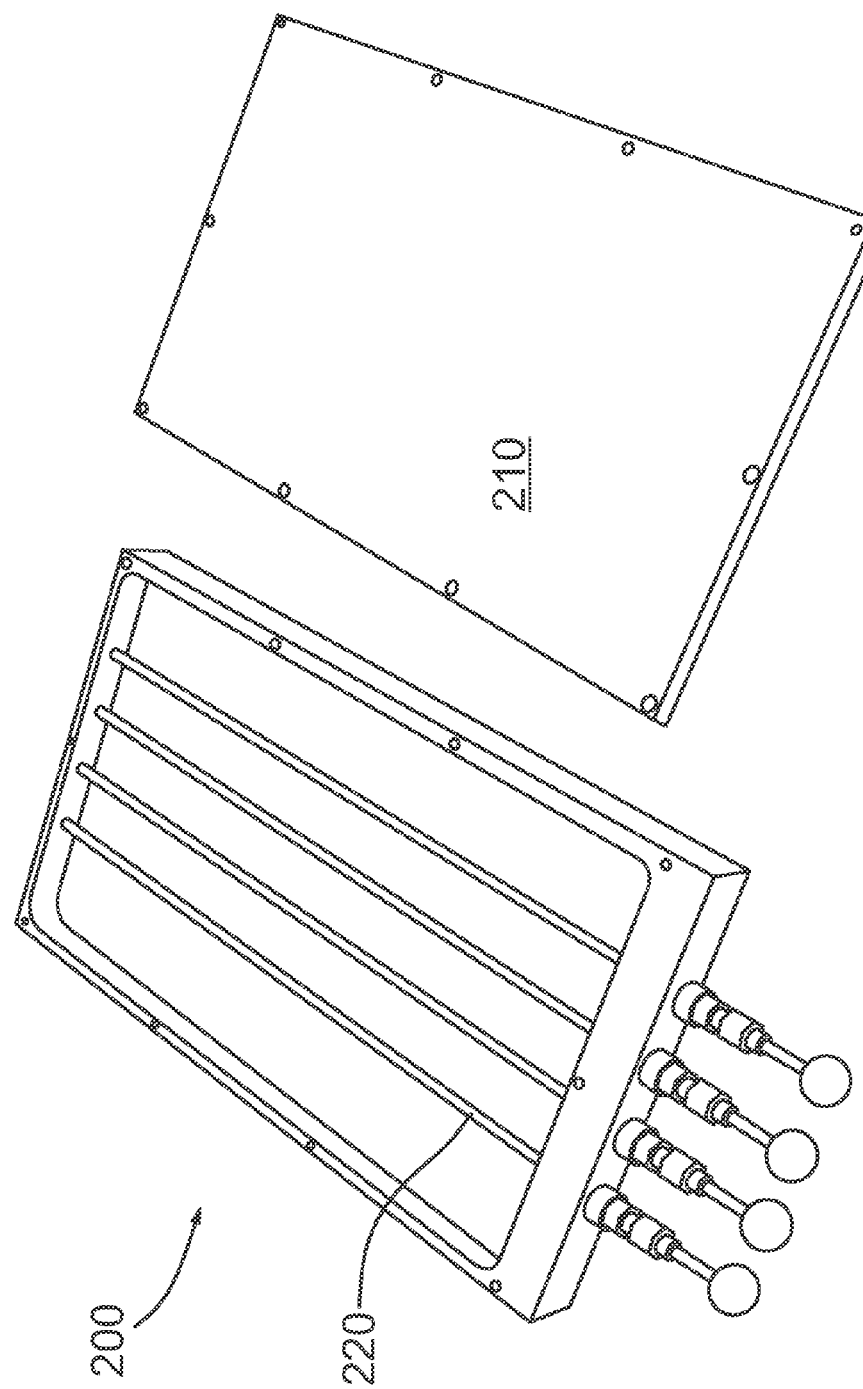
FIG. 6 shows a mold designed to produce multiple buried tubular structures within a synthetic tissue section.

Another model was developed to provide a PVA-hydrogel surgical training aid that imitates coronary arteries laying on the surface of a synthetic 'heart'. A mold, comprising a base 200, cover plate 210, and rods 220, was designed to make a block of PVA with 4 parallels arteries protruding from the surface. The arteries ranged in diameters from 1.75, 2, 2.25 and 2.5 mm. The wall thickness was kept constant at 0.5 mm. The mold was filled with PVA solution (processing described before) and cycled up to 6 times to obtain the desired properties, close to myocardium. FIG. 6 shows the mold designed for coronary arteries.

Figure 7:
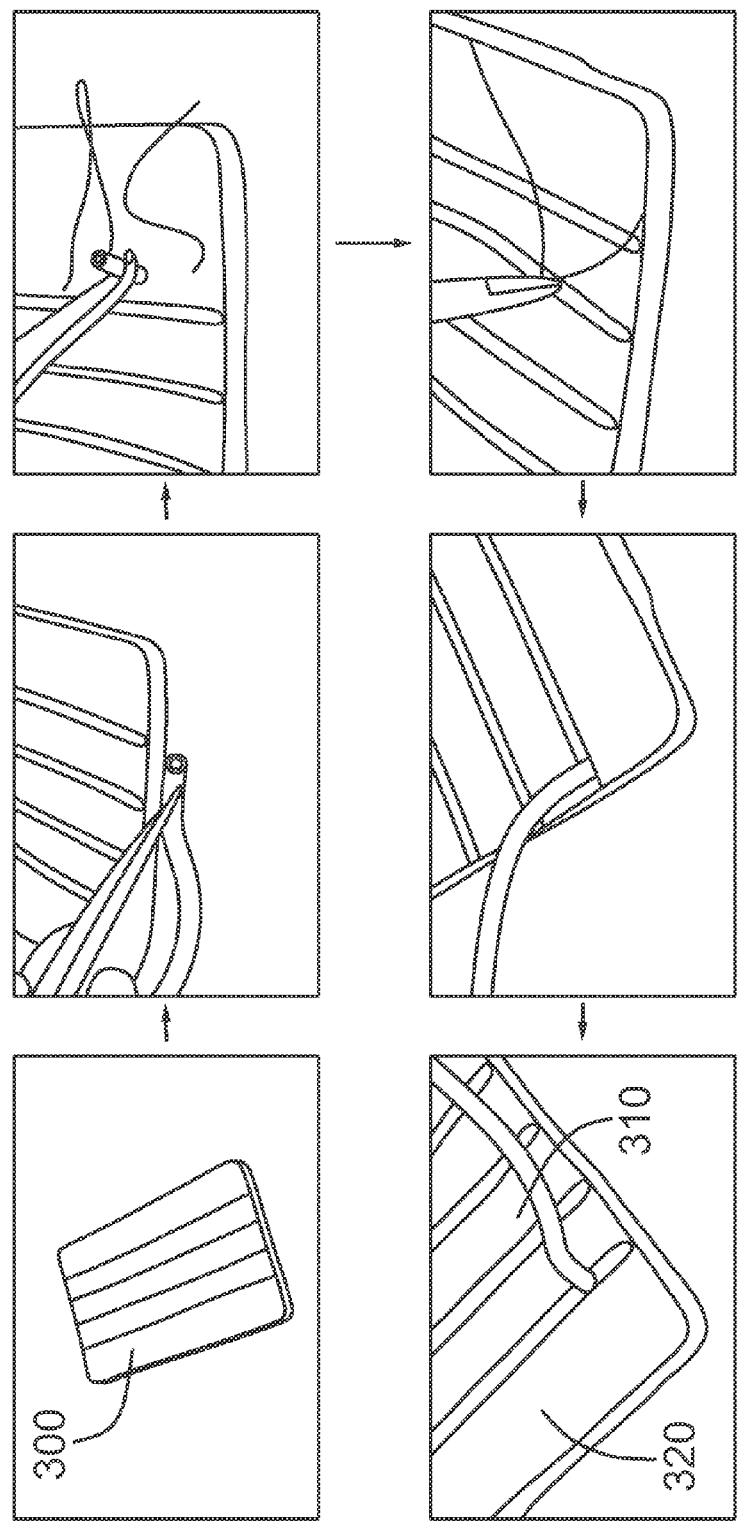
FIG. 7 shows a surgical training device produced by the mold shown in FIG. 6.

A surgeon practiced an anastomosis procedure of small diameter PVA conduits (vein) onto the PVA "coronary arteries" on the surface of the surgical aid. This procedure, together with the previous example, imitates the full procedure implemented in CABG surgery, where the bypass graft is anastomosed to the aorta at one end and to the coronary artery at the other end. FIG. 7 shows the step-by-step anastomosis of a match of PVA vein 310 to coronary arteries 320 on the 'heart' 300.

Example 4

Skin Suturing Model

Figure 8A:
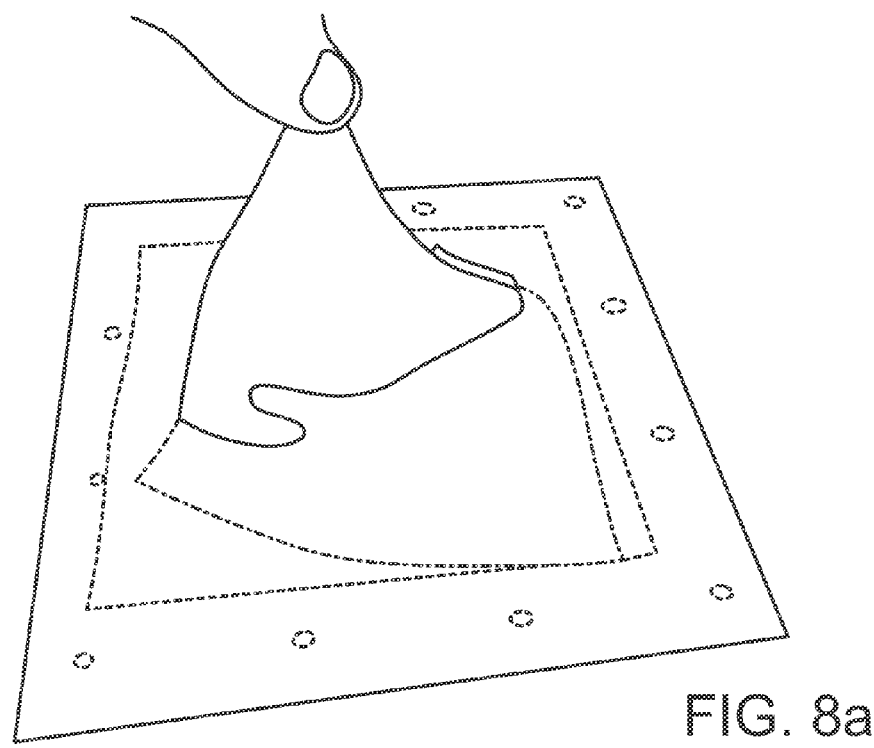
FIG. 8 shows a PVA-hydrogel composite material adapted to simulate the mechanical properties of skin.
Figure 8B:
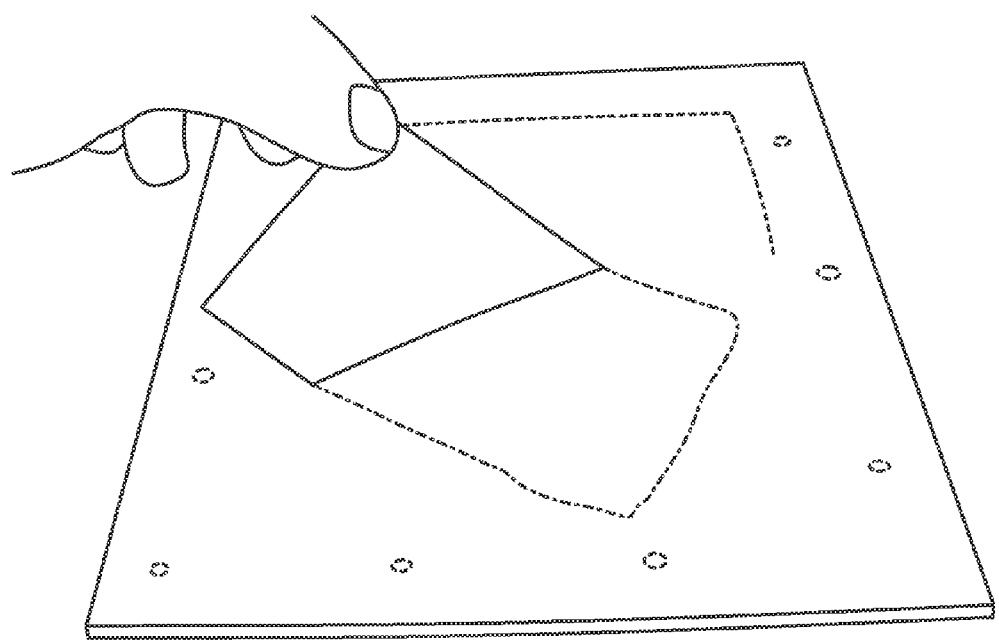

A preliminary model developed involved a PVA surgical aid that imitates skin to practice suturing. A mold was designed to make rectangular sheets of PVA. The mold was filled with PVA solution (processing described before) and cycled up to 6 times to obtain the desired properties, close to human skin. FIG. 8 shows (a) soft and (b) hard synthetic skin formed according to an embodiment of the invention.

The sheet can also made anisotropic by making an initial sample cycle 1 and then transfer the samples into a custom designed mold that allowed the sample to be held in place at a desired strain in one direction of up to 100% of the original length. The stretched sample can be cycled additional times, preferably up to 5 more times.

Figure 9:
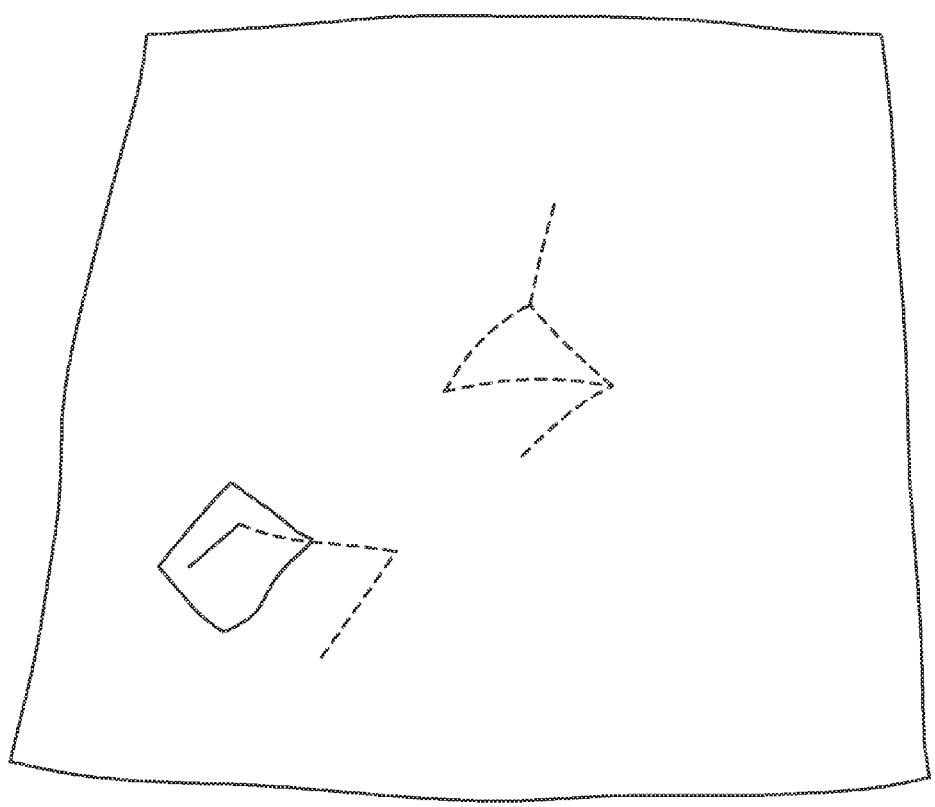
FIG. 9 shows a bilayer skin, with a stiffer top, simulating dermis and epidermis, and a softer bottom, simulating fat. Different suturing techniques were performed.

Multilayer skin was created by first thermally cycling a layer in a sheet-shaped mold for 6 thermal cycles, with a predetermined thickness, imitating the epidermis and dermis. The mold comprised an aluminum support with an inner gasket for receiving the PVA solution. After this stiffer epidermis/dermis sheet is made, the layer was removed from the gasket, and transferred to a thicker gasket within the aluminum mold. New solution was injected over the previously formed layer and the mold was closed. This mold was also cycled for 3 thermal cycles to create a subcutaneous tissue layer, in which the main component is fat. The level of complexity/mechanical properties and number of layers can be altered by repeating the steps mentioned and optionally the precursor solution. FIG. 9 provides an image of multilayer skin formed according to the aforementioned method.

Example 5

Development of Other Cardiovascular Models and Other Tissues and Organs for Surgical Training

The inventors have additionally designed molds for aortic heart valves, including aortic, mitral valve, pulmonary and tricuspid, aortic valved conduit, as well as heart valve stents. Some of these models are designed simulating diseased tissues as well, for practicing heart valve repair. These models could be produced as well to train on other vascular surgical procedures. PVA and PVA composites, specifically PVA-bacterial cellulose nanocomposites, display similar properties to many types of soft tissues, depending on processing parameters and degree of anisotropy introduced. Among the tissues that can be imitated and designed include cartilage, tendons and ligaments, and internal organs, such as urethra, kidney, prostate, pancreas, esophagus, lung, eye, brain, and other soft tissues.

Example 6

PVA-Based Surgical Training Aid for Practicing Mitral Valve Repair Procedures

Figure 10A:
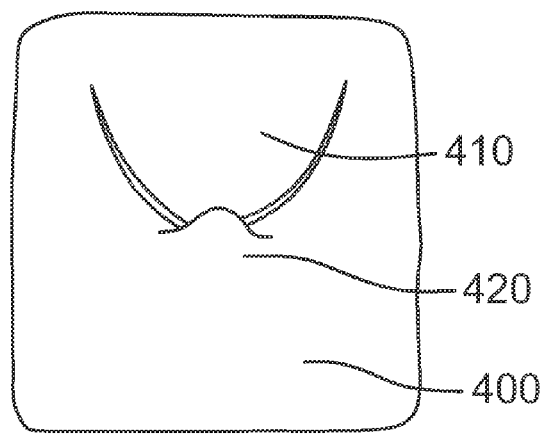
FIG. 10 shows (a) a prototype of the prolapsed mitral valve, (b) the bulge being removed, and (c) the use of an annuloplasty ring to repair the valve.
Figure 10B:
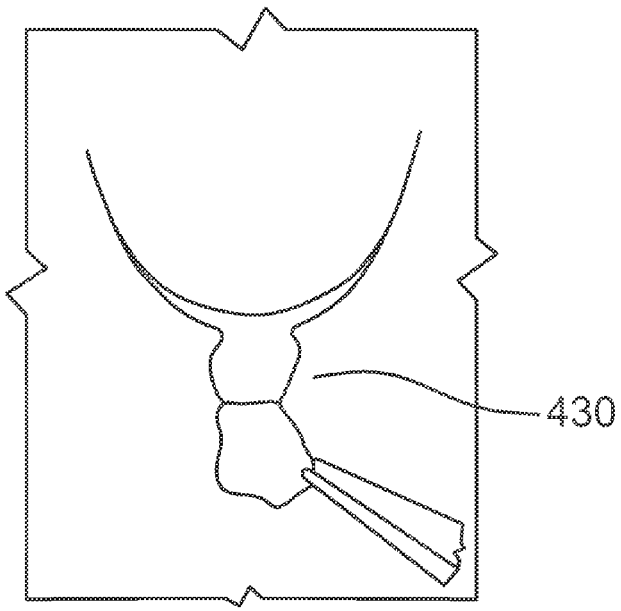
Figure 10C:
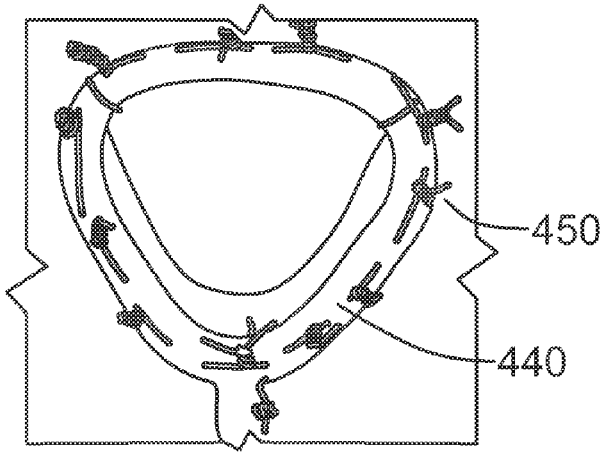

A prolapsed or diseased mitral valve was created using PVA to mimic a realistic touch and feel. The prolapsed valve imitated the bulge in the anterior leaflet, which is surgically removed, and an annuloplasty ring is placed around the valve to give extra stability to the repaired tissue. FIG. 10 shows a sequence of the procedure. FIG. 10 (*a*) shows a prototype 400 of the prolapsed mitral valve 410, including bulge 420, while FIG. 10(*b*) shows the bulge being removed, leaving opening 430. In FIG. 10(*c*), an annuloplasty ring 440 (Edwards Lifesciences) is shown installed using sutures 450 for repairing the valve. This model, as well as other possible diseased models of the four heart valves (aortic, mitral, pulmonary, and tricuspid), was developed with the aim of demonstrating and gaining experience in the use of annuloplasty rings in cardiac surgery, specifically heart valve repair procedures.

Figure 11:
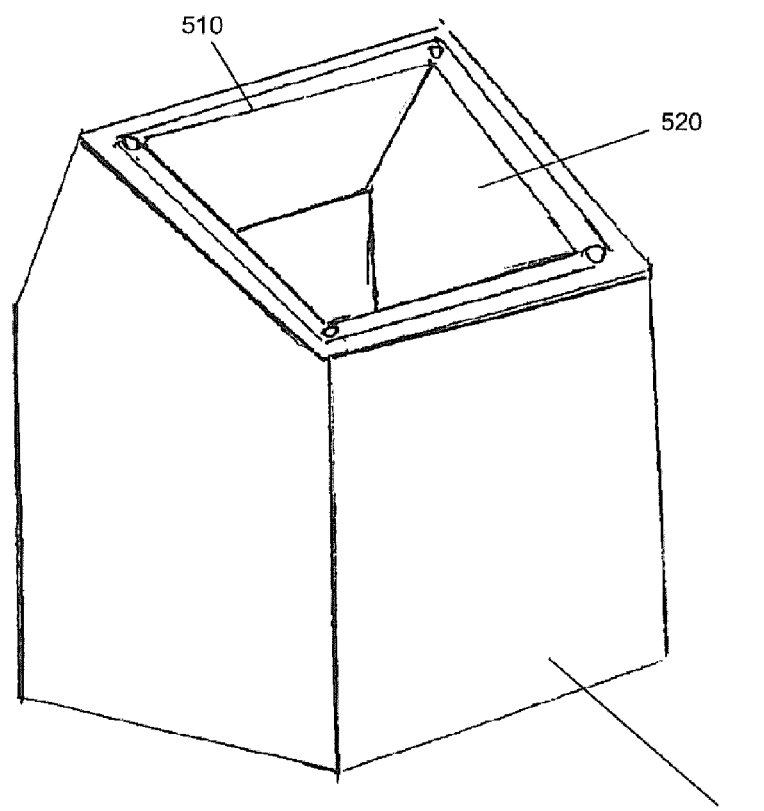
FIG. 11 is an illustration of a base for holding a hydrogel-based heart valve model.

FIG. 11 shows an illustration of a base 500 for securing the hydrogel-based mitral valve during a surgical training procedure. The base secures the valve in place by clamping the rim of the valve using clamp 510, while providing a central hole 520 for the instruments to be able to go through, similar to the ventricle underneath the real valve. The valve may be inclined at an angle to imitate the view to the surgeon, or the angle could be adjusted The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method of producing a multilayer hydrogel, said method comprising the steps of:
    a) flowing a first volume of a first aqueous solution of polyvinyl alcohol into a mold;
    b) thermally cycling said solution through at least one freeze-thaw cycle to form a polyvinyl alcohol hydrogel layer within said mold;
    c) flowing an additional volume of an additional aqueous solution of polyvinyl alcohol directly on top of the previously formed polyvinyl alcohol hydrogel layer; and
    e) thermally cycling said additional aqueous solution through at least one freeze-thaw cycle to form a multilayer polyvinyl alcohol hydrogel layer within said mold.

2. The method according to claim 1 wherein one of a temperature rate change during said thermal cycling, a number of thermal cycles, maximum and minimum temperatures attained during said thermal cycling, a freezing holding time, a concentration of polyvinyl alcohol, and any combination thereof, are controlled such that said multilayer hydrogel exhibits at least one mechanical property approximately equal to that of an organ.

3. The method according to claim 1 wherein said mold further comprises a rod for forming an embedded tubular structure within a layer of said multilayer hydrogel, said method further comprising the step of removing said rod from said multilayer hydrogel prior to step e).

4. The method according to claim 1 further comprising the step of applying strain to said multilayer hydrogel while performing one or both of step b) and step d) for generating anisotropy within at least one layer of said multilayer hydrogel.

5. The method according to claim 1 wherein steps d) to e) are repeated at least once.

6. The method according to claim 1 wherein a mechanical property of each layer within said multilayer hydrogel is selected to approximate skin.

7. The method according to claim 1 wherein said first aqueous solution of polyvinyl alcohol and said additional aqueous solution of polyvinyl alcohol are a common solution of polyvinyl alcohol.

8. A multilayer anatomical model of an organ comprising a multilayered hydrogel, formed from multiple hydrogel layers, wherein each hydrogel layer of said multilayered hydrogel is directly adhered to an adjacent hydrogel layer, and is configured to approximate at least one mechanical property of a corresponding layer of said organ.

9. The model according to claim 8 wherein each hydrogel layer comprises polyvinyl alcohol.

10. The model according to claim 8 wherein a concentration of water in each layer exceeds approximately 70%.

11. The model according to claim 8 wherein said organ is skin.

12. The model according to claim 8 wherein a layer of said multilayered hydrogel further comprises a hollow tubular structure.

* * * * *

UNITED STATES PATENT AND TRADEMARK OFFICE
CERTIFICATE OF CORRECTION

| | | |
|---|---|---|
| PATENT NO. | : 8,870,576 B2 | Page 1 of 1 |
| APPLICATION NO. | : 13/497670 | |
| DATED | : October 28, 2014 | |
| INVENTOR(S) | : Leonardo Millon, Wan-Kei Wan and Mackenzie Quantz | |

It is certified that error appears in the above-identified patent and that said Letters Patent is hereby corrected as shown below:

Claims

In column 14, line 4, claim 1 of the Letter Patent, step "e)" should be changed to step "d)", such that claim 1 correctly reads as:

1. A method of producing a multilayer hydrogel, said method comprising the steps of:
   a) flowing a first volume of a first aqueous solution of polyvinyl alcohol into a mold;
   b) thermally cycling said solution through at least one freeze-thaw cycle to form a polyvinyl alcohol hydrogel layer within said mold;
   c) flowing an additional volume of an additional aqueous solution of polyvinyl alcohol directly on top of the previously formed polyvinyl alcohol hydrogel layer; and
   d) thermally cycling said additional aqueous solution through at least one freeze-thaw cycle to form a multilayer polyvinyl alcohol hydrogel layer within said mold.

In column 14, line 18, claim 3 of the Letter Patent, step "e)" should be changed to step "d)", such that claim 3 correctly reads as:

3. The method according to claim 1 wherein said mold further comprises a rod for forming an embedded tubular structure within a layer of said multilayer hydrogel, said method further comprising the step of removing said rod from said multilayer hydrogel prior to step d).

In column 14, line 24, claim 5 of the Letter Patent, "steps d) to e)" should be changed to "steps c) and d)", such that claim 5 correctly reads as:

5. The method according to claim 1 wherein steps c) and d) are repeated at least once.

Signed and Sealed this
Fifth Day of January, 2016

Michelle K. Lee
*Director of the United States Patent and Trademark Office*